Figure 1:
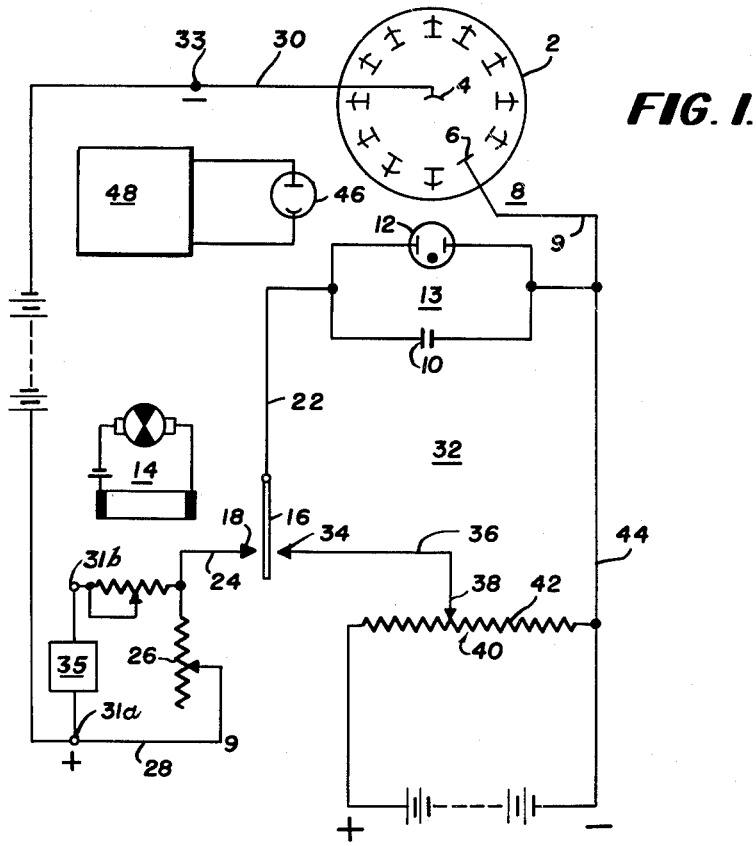

June 12, 1956     T. FAHRNER ET AL     2,750,518

REGENERATIVE PHOTOTUBE SIGNAL AMPLIFIER

Filed March 21, 1952

INVENTORS
TED FAHRNER
WILLIAM W. RAMAGE

BY George Sipkin
ATTORNEY

2,750,518

REGENERATIVE PHOTOTUBE SIGNAL AMPLIFIER

Ted Fahrner, Whittier, Calif., and William W. Ramage, Verona, Pa., assignors, by mesne assignments, to the United States of America as represented by the Secretary of the Navy Application March 21, 1952, Serial No. 277,882

5 Claims. (Cl. 250—214)

This invention relates to photo-detecting systems, and more particularly relates to photo-detecting systems for detecting faint light through amplifying regenerative action; the term, light, including any radiation of a nature similar to that ordinarily known as light.

It is known to detect or measure pulses of light or continuous light by means involving a form of phototube which responds to the light-flux and a form of amplifier that magnifies the response. However, it is difficult to provide and use an electronic amplifier for the detection of very weak light signals because it is necessary to use a high-resistance input circuit and multiple amplifying stages in order to get adequate gain without undesirable distortion or extraneous pick-up and noises.

A general object of the invention is to provide an extremely simple and inexpensive light-responsive system that is capable of producing a relatively high intensity output signal upon reception of a comparatively much fainter input signal.

A further object of the invention is to provide a simple system for converting a very faint input light into a signal of much greater intensity, the signal having a characteristic which is a measure of the input light.

In accordance with certain features of a preferred form of the invention, a photo-sensitive element is made part of a first charging circuit comprising a capacitor and a glow tube in parallel. Switching means in the form of a make-and-break device of any suitable nature completes and interrupts this charging circuit. During the period of circuit completion, the charge on the capacitor increases at a rate determined by the conductivity of the photo-sensitive element. Consequently, the initial time of breakdown of the glow tube, which breaks down when the capacitor receives a certain charge, is controlled by the intensity of the light hitting the photo-sensitive element. Once the glow tube breaks down, its light becomes a much amplified measure of the input signal, and the output light can be utilized in any suitable manner for detection, measurement or otherwise, as is known to the art. The glow tube may continue to glow until the first charging circuit is interrupted; and if the input signal is continuous the glow tube will again glow when the circuit is remade. This cycle repeats with each operation of the make-and-break device. Preferably, the capacitor is connected to a second charging circuit during the time the first charging circuit is interrupted, so as to have a bias somewhat below the threshold or breakdown voltage of the glow tube at the moment that the phototube circuit is again completed by the make-and-break device.

Figure 2:
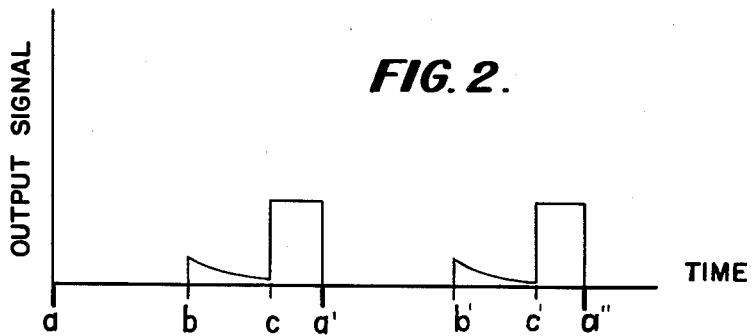

For a better understanding of my invention, together with other and further objects thereof, reference is had to the following description, taken in connection with the accompanying drawing, in which Fig. 1 is a diagrammatic representation of an apparatus embodying a preferred form of my invention; and Fig. 2 is a curve for explaining the principles underlying the operation of the apparatus; the abscissae of the curve representing time and the ordinates representing output signal intensity.

In Fig. 1 a photo-sensitive element which is exposed in any suitable manner to the light to be detected or measured is represented symbolically as a photo-multiplier tube 2 having a cathode 4 and an anode 6. The tube 2 is part of a charging circuit 8 that includes a conductor 9 and a capacitor 10 and glow tube 12 connected in parallel to form a relaxation branch circuit 13. The capacitor 10 should be preferably of small capacitance; and in the preferred embodiment, the glow tube 12 is of a type more commonly known as a neon tube and has only two electrodes. The charging circuit 8 is intermittently, preferably cyclically, completed and interrupted. To this end any adjustable cyclic circuit controller may be provided, shown for convenience as comprising a high speed relay, timing alternator or vibrator 14 having a movable contact 16 and a front or make contact 18, both contacts being in the charging circuit 8.

More specifically, the charging circuit 8 comprises the conductor 9 extending from the anode 6 of the tube 2 to one side of the branch circuit 13, a conductor 22 extending from the other side of the branch circuit 13 to the movable contact 16, a conductor 24 extending from the front contact 18 to a resistor 26, the resistor 26 being preferably of high resistance, and a conductor 28 extending from the resistor 26 to the positive terminal 31a of a D. C. voltage supply. The negative terminal of the D. C. power supply is connected to the cathode 4 of the tube 2 through terminal 33 and conductor 30. An output signal may be obtained from the charging circuit 8 by connecting any suitable receiver 35 between terminals 31a and 31b connected across the resistor 26 which serves to produce a signal output voltage.

The capacitor 10 is biased by a biasing circuit 32 which includes, in series, the branch circuit 13, the conductor 22, the movable contact 16 of the vibrator 14, a back or break contact 34 of the vibrator, a conductor 36 that extends from the back contact 34 to an adjustable arm 38 of a resistor-potentiometer 40, and through the arm 38 and the voltage-supplying portion 42 of the potentiometer 40 to conductor 44 extending to the other side of the branch circuit 13. Any suitable D. C. voltage supply is connected across the potentiometer 40 in a manner to make the voltage appearing at the arm 38 positive with respect to the conductor 44. The portion 42 of the potentiometer provides a voltage supply for charging the capacitor 10 to a bias voltage that corresponds to the voltage drop across the portion 42, this voltage drop being adjustable by movement of the arm 38 in a well known manner.

It is to be observed that the branch circuit 13 and the movable contact 16 are common to both the biasing circuit 32 and the charging circuit 8; and that operation of the vibrator 14 connects the branch circuit 13 alternately in the charging circuit 8 and the biasing circuit 32. The time constant of the charging circuit 8 changes in accordance with the intensity of the light striking photo-multiplier tube 2, and has a maximum value when the light is weakest.

Although not limited thereto, the present invention contemplates the use of a photo-multiplier tube, in which the amplification is very high. The effective resistance of the photo-detector preferably possesses the characteristic of producing a large change in its effective resistance in response to light thereon.

In operation, the D. C. voltage connected across the conductors 30 and 28 is above the characteristic ignition voltage of the glow tube 12; whereas that supplied by the potentiometer-portion 42 is below this breakdown potential. Preferably, both of the aforesaid voltages are constant.

The period of engagement of the movable contact 16 with the back contact 34 is adequate to permit the capacitor 10 to be charged to a voltage that corresponds to the potential of the arm 38. This voltage obviously provides a biasing charge or voltage on the capacitor 10 that brings the voltage across the glow tube 12 closer to its breakdown voltage.

For the purpose of illustrating the operation of the circuit shown in Figure 1, assume that after the capacitor 10 has received the available biasing charge, the vibrator 14 moves the movable contact 16 into engagement with the front contact 18. The biasing circuit 32 is now interrupted and the charging circuit 8 is completed. The charging circuit 8 comprises, in series, the D. C. voltage supply connected between the conductor 30 and terminal 31a, the photo-detector tube 2, the conductor 9, the branch circuit 13, the conductor 22, the movable contact 16, the front contact 18, the conductor 24, the resistor 26, and the conductor 28. The charge-voltage on the capacitor 10 will now increase from its initial bias voltage toward that of the D. C. supply across the conductors 28 and 30 at a rate determined by the resistance of the resistor 26 and the effective resistance of the photo-detector tube 2, the effective resistance of the photo-detector tube being dependent upon the strength of the incident signal. As the charge on capacitor 10 increases, the voltage across the glow tube 2 rises until the breakdown value is reached. Other things being equal, the speed with which this breakdown voltage is reached is obviously dependent on the intensity of the input signal observed by the photo-detector tube 2. Upon breakdown, the glow tube 12 produces a bright light which is directed toward the tube 2 for regenerative action. Tube 12 continues to provide bright light until the charging circuit is interrupted.

When the light from the glow tube 12 strikes the photo-detector 2, the effective resistance of the photo-detector is greatly reduced which increases the voltage applied to the glow tube 2. The glow tube 2 therefore continues to glow until the contacts 16 and 18 are opened.

The vibrator 14 is arranged to break engagement between its contacts 16 and 18 while the flash of the glow tube still persists. Under such operation, when the contacts 16 and 18 disengage, the charging circuit 8 is interrupted and the glow tube becomes extinguished because the charge on the capacitor 10 is almost immediately dissipated through the resistance of 42 to the potential appearing thereacross. The capacitor is again charged to the biasing voltage during the time that the movable contact 16 re-engages the back contact 34.

Fig. 2 diagrammatically illustrates the operation of the system of Fig. 1 in accordance with the preceding description. Each space between the heavy abscissae marks $a$, $a'$, $a''$ represents a complete vibrator cycle. The fraction of a cycle from $a$ to $b$ represents the time that the charging circuit 8 is interrupted, a major part of this fraction being representative of the time of engagement of the contacts 16 and 34. At time-point $b$, the contact 16 first engages the contact 18 to complete the charging circuit 8. The charge on the capacitor 10 then increases; the current flow in the charging circuit being initially relatively higher and gradually falling as the capacitor charges until at time point $c$ the voltage on the capacitor 10 has become high enough to cause the glow tube 2 to break down, producing a flash. Upon breakdown of the glow tube, the current increases sharply, as indicated in Fig. 2 at time-point $c$, and the increased current flow continues until time-point $a'$ representing the time of initial disengagement of the contacts 16 and 18 for interrupting the charging circuit 8. The cycle then repeats.

Accordingly, a plurality of light flashes or current pulses are obtained, each of which extends from time-point $c$ to time-point $a'$. For particular values of the capacitor 10, the various resistors, and the bias voltage, the instant at which time-points $c$ occur with respect to time-points $a$ depends on the rate of charging of the capacitor 10 when it is in the charging circuit 8, and this rate is in turn dependent on the intensity of the input light signal incident on tube 2. Accordingly, the length of a pulse from $c$ to $a'$, for example, is a function of the intensity of the incident signal; and the system can readily be calibrated under standard conditions. The average height of the pulse is dependent upon the glow tube illumination. Accordingly, in a sense, the charging circuit 8 and the biasing circuit 32 comprise a means for converting the received signal on the tube 2 into a plurality of pulses of a length commensurate with the intensity of the signal.

The glow tube 12 can be made to glow upon a second photo-sensitive tube, if desired, and the response of this photo-sensitive tube measured or utilized in any suitable way. This embodiment is also indicated in Fig. 1 wherein such a second photo-sensitive tube is represented at 46 and operates any suitable detecting or receiving apparatus 48. The light received by the tube 46 will be a greatly amplified measure of the signal on the tube 2.

The portion of the length of a pulse, that is the time-interval from $c$ to $a'$, for example, can be arbitrarily lengthened or shortened by changing the capacitance of the capacitor 10 or by changing the voltage across the potentiometer portion 42, through adjustment of arm 38. Changing the bias voltage by moving the arm 38 changes the voltage across the glow tube 12 at the time that the contacts 16 and 18 initially engage. Changing the capacitance of the capacitor 10 changes the rate at which the voltage across the branch circuit 13 builds up to breakdown voltage for the glow tube 12. With reference to Fig. 2, changing the capacitance changes the position of the time-point $c$ with respect to time-point $b$. Accordingly, the system described lends itself to detection of a single light-pulse signal.

It should be understood, of course, that the foregoing disclosure relates to only a preferred embodiment of the invention and that numerous modifications or alterations may be made therein without departing from the spirit and the scope of the invention as set forth in the appended claims.

Having thus described the invention, what is claimed is:

1. A light amplifying system adapted to provide a large signal output of a time duration proportional to the signal light intensity comprising, a branch circuit including a capacitor and a glow tube having a breakdown voltage in parallel relation with each other, a first circuit means for charging said capacitor to a predetermined voltage below the breakdown voltage of said glow tube, a second circuit including a light responsive element having an impedance value varying inversely with the light intensity of the signal for charging said capacitor through said light responsive element to the breakdown voltage of said glow tube at a rate determined by the impedance value of said light responsive element, said glow tube being adjacent said light responsive element to reduce the impedance thereof to maintain said glow tube conductive after ignition, a timing alternator interposed between said branch circuit and said first and second circuits for alternately connecting said first and second circuits with said branch circuits, and means connected to said second circuit for producing a signal output during conduction of said glow tube, whereby the timing alternator is operative to provide a time base for said signal output.

2. A detection system for radiant energy comprising a radiant energy detector having an impedance varying in magnitude inversely with the intensity of the radiant energy to be detected, a glow tube having a predetermined ignition voltage positioned adjacent said radiant energy detector to reduce the impedance thereof by radiant energy produced when said glow tube is ignited whereby to maintain said glow tube ignited after ignition, a capacitor connected in parallel with said glow tube, circuit means including a first D. C. power supply for charging said capacitor to the ignition voltage of said glow tube through said radiant energy detector at a rate determined by the impedance of said radiant energy detector, second circuit means including a second D. C. power supply for charging said capacitor to a predetermined voltage below its ignition voltage, and time-controlled means for sequentially connecting said capacitor to said first and second circuit means at a predetermined cyclic rate, whereby the proportion of time during each cycle of said time-controlled means which the glow tube is ignited is a measure of the intensity of the radiant energy.

3. The device as claimed in claim 2 wherein said radiant energy detector is a photo-multiplier tube.

4. The device as claimed in claim 2 wherein said time-controlled means comprises a relay having normally open and normally closed contacts, and cyclically operated switch means for controlling actuation of said relay.

5. A detection system for radiant energy comprising a radiant energy detector having an impedance varying in magnitude inversely with the intensity of and positioned in the field of the energy to be measured, a glow tube having a predetermined ignition voltage and producing radiant energy when ignited, said glow tube being mounted adjacent said radiant energy detector to reduce the impedance thereof when said glow tube is ignited, a capacitor connected in parallel with said glow tube, and circuit means including a D. C. power supply for charging said capacitor through said radiant energy detector to delay ignition of said glow tube by a first time interval determined by the radiant energy to be detected, and means for cyclically interrupting said circuit means at second predetermined time intervals, whereby the difference between said first and second time intervals is a measure of the intensity of the radiant energy to be measured.

References Cited in the file of this patent
UNITED STATES PATENTS

| | | |
|---|---|---|
| 2,386,320 | Kott | Oct. 9, 1945 |
| 2,388,854 | Le Page | Nov. 13, 1945 |